United States Patent [19] [11] 3,925,591
Breitenfellner et al. [45] Dec. 9, 1975

[54] TRANSPARENT LAMINATE FILMS OF POLYOLEFINES AND POLYESTERS AND PROCESSES FOR THEIR MANUFACTURE

[75] Inventors: Franz Breitenfellner; Wolfgang Eberle, both of Bensheim, Germany

[73] Assignee: Ciba-Geigy Corporation, Ardsley, N.Y.

[22] Filed: Jan. 29, 1975

[21] Appl. No.: 544,985

[30] Foreign Application Priority Data

Feb. 5, 1974 Switzerland.......................... 1554/74

[52] U.S. Cl. ................ 428/483; 156/244; 156/332; 264/171; 264/176; 428/516; 428/520; 428/339
[51] Int. Cl.² B32B 27/08; B32B 27/32; B32B 27/36
[58] Field of Search.................... 161/165, 231, 254; 156/244, 332; 264/171, 176

[56] References Cited
UNITED STATES PATENTS

| | | | |
|---|---|---|---|
| 3,017,302 | 1/1962 | Hultkrans | 161/231 |
| 3,423,231 | 1/1969 | Lutzmann | 161/254 |
| 3,455,720 | 7/1969 | Davies et al. | 161/231 |
| 3,524,795 | 8/1970 | Peterson | 264/171 |
| 3,627,625 | 12/1971 | Jarrett | 161/231 |

Primary Examiner—William J. Van Balen
Attorney, Agent, or Firm—Luther A. R. Hall

[57] ABSTRACT

Laminate films of polyesters which are difficult to crystallise and of polyethylene, bonded with an ethylene/vinyl acetate copolymer as an adhesion promoter, can be deep-drawn and do not lose their transparency during the stretching process. The laminates are particularly suitable for transparent packaging.

10 Claims, No Drawings

TRANSPARENT LAMINATE FILMS OF POLYOLEFINES AND POLYESTERS AND PROCESSES FOR THEIR MANUFACTURE

The present invention relates to deep-drawable, transparent laminate films consisting of polyethylene films and polyester films made of, or based on, polyethylene terephthalate (hereafter referred to as polyester), the individual films being bonded to one another by means of an ethylene/vinyl acetate copolymer as an adhesion promoter, and to processes for their manufacture.

Individual films of a thermoplastic have a specific pattern of properties which determines their field of use. Thus, for example, the gas permeability of films is of considerable importance in deciding the ability of packaging films to keep foodstuffs fresh. Individual films generally have different permeabilities for the same gases. Thus, polyethylene has a lower water vapour permeability, whilst the permeability to oxygen, nitrogen and carbon dioxide is relatively high. Converse relationships apply to polyamide films and polyethylene terephthalate films. For this reason, it is advantageous to use laminates of different thermoplastics for packaging.

Laminate films which have been disclosed for this field of packaging are those of polyamides or biaxially stretched polyethylene terephthalate and high pressure polyethylene of low density (LDPE) (see "Polyamidfolien und verbundfolien" ("Polyamide films and polyamide laminate films"), Kunststoffe 61,1971, page 518 et seq.), since these combinations give gas barrier properties which are advantageous from the point of view of keeping products fresh. In this field, polyamide/-polyethylene laminate films have attained by far the greatest importance, which is explicable in terms of the other properties of these laminates, such as adequate transparency, deep-drawability, weldability and sealability as well as good mechanical strength properties, and also by the fact that these laminates, manufactured according to known processes, exhibit good bond strength.

In contrast, the abovementioned laminates with biaxially stretched polyethylene terephthalate films, manufactured by lamination processes, are of little importance, since, as a result of the stretching which has already been carried out, these laminates lack the property of good deep-drawability, which is important for further processing. Another factor to be taken into account is that stretching is necessary to achieve good transparency, since polyethylene terephthalates are able to crystallise relatively easily, causing the films to lose their optical clarity. The crystallisation can occur already during the manufacture of the unstretched laminate films or only during their further processing, for example during the deep-drawing process.

It is known that polyethylene/polyester laminate films have inadequate bond strength and that suitable adhesion promoters are necessary to ensure adequate adhesion during the manufacture and further processing of the laminates, especially during deep-drawing. Particularly with regard to the manufacture of these laminates by the economical process of co-extrusion, the difficulties of bond strength have not yet been overcome. Hitherto, no deep-drawable transparent laminate films of polyethylene films and polyester films have been disclosed which lose neither their optical clarity nor their bond strength after the deep-drawing process and which can, furthermore, also be manufactured by co-extrusion.

It has now been found that by selecting certain polyethylene terephthalates of low crystallisation capacity and using an ethylene/vinyl acetate copolymer as the adhesion promoter, laminate films with polyethylene are obtained, which have the abovementioned properties. Accordingly, the present invention relates to deep-drawable, transparent laminate films of polyethylene films, polyester films and an adhesion promoter, characterised in that at least one unstretched polyester film consisting of, or based on, polyethylene terephthalate, having a crystallisation temperature of at least 150°C, measured in the film, is bonded to at least one unstretched polyethylene film via an adhesion-promoting layer of ethylene/vinyl acetate copolymer.

Preferably, the crystallisation temperature of the polyester film is 160°C or above, and preferably the ethylene/vinyl acetate copolymer has a melting point of 40° to 95°, especially 45° to 75°C. Since the melting point depends on the vinyl acetate content in the copolymer, the abovementioned melting point ranges correspond to a vinyl acetate content of about 20 to 40, preferably 25 to 35% by weight, based on the copolymer.

The crystallisation temperature ($T_C$) is to be understood as the temperature at which the rate of crystallisation is a maximum. It is a measure of the crystallisability of a polyester, which is the lower, the higher is the crystallisation temperature. The latter is determined by means of a DSC-1B differential scanning calorimeter of Messrs. Perkin-Elmer on samples which have been fused, heated for 3 minutes at 300°C and then chilled, the measurement being carried out at a rate of heating of 16°C/minute and the aluminium sample holders also being supplied by Perkin-Elmer (U.S.A.). The temperature of the apex of the exothermic peak of the specific heat in the thermogram is described as the crystallisation temperature. It is also possible for no exothermic peak to be observed in this method of measurement if the $T_C$ is above 150°C, because, due to the rate of crystallisation being too low, insufficient heat of crystallisation is released. This property of a polyester also lies within the sense of the present invention.

Polyester moulding materials of suitable crystallisation behaviour are obtained according to known processes, for example melt phase condensation and/or solid phase condensation, in the presence of catalyst combinations which contain one or more of the metals magnesium, zinc, cobalt and/or manganese as transesterification catalysts and which contain the customary metals such as antimony, lead, germanium and/or titanium as polycondensation catalysts. The catalysts can be used in the form of mixtures of metal powders, metal alloys or mixtures of metal compounds. Metals of the group of lithium, sodium, calcium, barium and/or strontium should not be present or should only be present in small amounts. Processes for the manufacture of such polyesters are described, for example, in DT-OS 1,720,253. Furthermore, crystallisation retarders, such as, for example, small amounts of a polymer which crystallises with difficulty, can also be used in order to adjust the crystallisation behaviour. Furthermore, it is possible to co-condense co-components, when manufacturing the polyester, which can also raise the crystallisation temperature.

Since the crystallisation temperature of films is generally lower than the crystallisation temperature in the moulding materials used for their manufacture, the crystallisation temperature in the moulding material must be above 150°C, preferably at least 160°C and in particular at least 170°C in order to give a crystallisation temperature of at least 150°C in the films according to the invention. The magnitude of the decrease in $T_C$ depends on the polyester and on the conditions of manufacture and can be determined by a preliminary experiment. The intrinsic viscosity should be at least 0.60 dl/g, whilst the upper limit is determined by economic factors. The moulding materials can also contain further customary additives such as stabilisers or lubricants. Polyesters which can be used in the laminate films according to the invention are the film-forming polyethylene terephthalates and the film-forming copolyesters based on polyethylene terephthalate. Preferably, the copolyesters contain at least 25 mol %, in particular at least 40 mol %, of condensed terephthalic acid radicals and at least 25 mol %, in particular at least 40 mol %, of condensed ethylene glycol radicals, relative to the polyester.

Dicarboxylic acid radicals suitable as co-components are, for example, those of phthalic acid, isophthalic acid, 1,4-,,2,5- or 2,6-naphthalenedicarboxylic acid, substituted terephthalic acids and/or isophthalic acids, whilst suitable diol radicals are those of 1,2-propanediol, 1,3-propanediol, 1,4-butanediol, 1,6-hexanediol, neopentyl glycol, 1,6-trimethylhexanediol, 1,4-cyclohexanediol and 1,4-dihydroxymethylcyclohexane. Copolyesters which contain 1 to 10 mol % of isophthalic acid radicals, 1 to 10, especially 2.5 to 7.5, mol % of 2,2'-dimethyl-bis-(4'-hydroxyethoxyphenyl)-propane radicals or 1 to 7.5, especially 2.5 to 5, mol % of 1,6-trimethylhexanediol radicals as condensed units are preferred.

The polyethylene film usually consists of commercially available polyethylene, with low density polyethylene (LDPE) being particularly preferred.

The laminate films according to the invention can be manufactured by means of the devices and processes known for the manufacture of films and laminates, for example lamination, extrusion coating or co-extrusion.

In lamination, the detailed procedure is, for example, that first polyethylene and a polyester of crystallisation temperature above 150°C, preferably at least 160°C, and in particular at least 170°C, are plasticised in an extruder and converted to unstretched flat films using a slit die or the film-blowing process. In a second process step, the individual films can then be bonded to one another, using an ethylene/vinyl acetate copolymer as the adhesion promoter, by applying the plasticised copolymer to one film web and bonding it to the second film web by applying pressure. The pressure can be applied by passing the film web coated with the adhesion promoter through a roll nip simultaneously with the second film web. Either the polyethylene film or the polyester film can serve as the carrier web for the adhesion promoter.

In extrusion coating, a possible procedure is to apply the ethylene/vinyl acetate copolymer to a previously produced unstretched polyester carrier film and then to combine it with a freshly extruded polyethylene film in the usual manner in the nip between a cooling roll and a pressure roll.

In the case of the laminating process it is necessary to bear in mind that the crystallisation temperature of the previously produced polyester films can decrease somewhat during the manufacture of the laminates. Hence, the polyester films used for this process should have a crystallisation temperature above 150°C, preferably at least 10°C above this temperature, so that the crystallisation temperature in the laminate films according to the invention is at least 150°C. The magnitude of the decrease depends on the polyester and on the process conditions and can be determined by means of a preliminary experiment.

However, the manufacture of the laminate films according to the invention can be carried out particularly advantageously by the economical process of co-extrusion. It has been found that the laminates manufactured by this process, using ethylene/vinyl acetate copolymers as adhesion promoters, exhibit excellent transparency and adhesion, which are fully preserved even during further processing.

A further subject of the present invention is therefore a process for the manufacture of deep-drawable, transparent laminate films of unstretched polyethylene films, unstretched polyester films having a crystallisation temperature of at least 150°C, measured in the film, and an adhesion promoter, characterised in that a) at least one polyethylene moulding material, b) at least one polyester moulding material consisting of, or based on, polyethylene terephthalate having a crystallisation temperature above 150°C and c) a moulding material of an ethylene/vinyl acetate copolymer as the adhesion promoter, are converted into the form of layers by co-extrusion by means of a multi-layer die or by means of several individual dies and the layers are bonded to one another, whilst still in the molten state, in the die or shortly after leaving the die.

The co-extrusion process according to the invention can be carried out in accordance with various embodiments which essentially differ in the form of die used and in the way in which the materials are combined. In general, the moulding materials are separately plasticised in extruders and the melts are fed into multi-layer dies, the adhesion promoter being located between the polyethylene layer and the polyester layer. When using a multi-layer annular die, the combination is effected in the die, or shortly after leaving the die by inflation of the innermost layer with an inert gas, for example air, nitrogen or carbon dioxide (tubular co-extrusion process). Thereafter, the laminate film is drawn off by squeeze rolls in the usual manner. If multi-layer slit dies are used, the combination is effected either by an appropriate arrangement of the individual die gaps whilst still in the actual die head, and the material is then drawn off via cooling rolls and pressure rolls, or the combination is effected outside the die head by pressure in a roll nip consisting of a cooling roll and a pressure roll, after which the laminate film can be drawn off by means of known devices. If several simple slit dies are used, the individual molten films can be combined, for example, by pressure in the roll nip formed by a cooling roll and pressure roll.

Using the abovementioned processes it is in principle possible to manufacture laminate films which consist of the adhesion-promoting layer and one or more polyethylene and polyester layers. The thickness of the layers depends on the end use. The adhesion-promoting layer of ethylene/vinyl acetate copolymer is preferably not thicker than 10 μ, especially 5 μ, and the polyethylene layer and polyester layer are generally at least 15 μ thick, especially at least 20 μ thick. The upper limit of thickness of the latter layers, which can be up to 100 μ and above, depends on the requisite thickness of the layer in the deep-drawn laminate film. The deep-drawing can be effected at temperatures of 80° to 150°C, preferably 90° to 130°C. if the crystallisation temperature of the polyester film is near the lower limit, a relatively lower temperature will be chosen to avoid crystallisation. With high $T_C$ values, a correspondingly higher temperature within the stated range can also be chosen for processing the material by deep-drawing.

The laminate films according to the invention exhibit excellent transparency and deep-drawability and surprisingly the transparency and adhesion remains completely preserved even after the deep-drawing process. Furthermore, they are distinguished by surface brilliance, very good mechanical strength, weldability and sealability, an ability to keep foodstuffs fresh, and physiological harmlessness, and also do not have an intrinsic odour. Because of these properties they are outstandingly suitable for use as a transparent packaging material, especially for foodstuffs. In order to improve their ability to keep foodstuffs fresh and reduce the gas permeability, it is possible to apply, for example, a polyvinylidene chloride lacquer coat to the surface of the laminate films in a known manner.

The examples which follow illustrate the invention in more detail. The intrinsic viscosity of the polyesters is determined at 30°C on a 1% strength solution consisting of equal parts of phenol and tetrachloroethane. The method of measurement of the crystallisation temperature has already been specified earlier. The crystallisation temperature of the polyester in the laminate film is determined on a cut-out sample using a heating rate of 16°C/minute, on a DSC-1B differential scanning calorimeter of Messrs. Perkin Elmer.

EXAMPLE

In extruder I of a ROTEX 25 D/15 triple-layer blown film installation from Messrs. Kiefel, Worms (West Germany), Lupolen 3020 D (LDPE from BASF) is plasticised, and conveyed, at 250 revolutions/minute and temperatures of 195°C. In extruder II, an ethylene/vinyl acetate copolymer (Nipoflex 750 of Nippon Leather Ind. Co.) is plasticised at temperatures of 175°C and a screw speed of 175 revolutions/minute, whilst in extruder III a polyethylene terephthalate copolyester containing 7.5 mol % of 2,2-dimethyl-bis-(4,4'-hydroxyethoxyphenyl)propane (relative to the diol component), which has an intrinsic viscosity of 1.08 dl/g and of which the crystallisation temperature lies outside the range of measurement, is plasticised and conveyed at temperatures of 250°C and a screw speed of 80 revolutions/minute. After issuing through the die gap of a multi-layer annular die, the melts are combined by inflating the inner tube with air, the Lupolen 3020 D being on the inside and the copolyester on the outside, whilst the Nipoflex 750 acts as the adhesion promoter. The multi-layer annular die, that is to say the blow head, is kept at 225°C. The film is drawn off in the usual manner by means of squeeze rolls, at a speed of 4.5 metres/minute. The layer thicknesses, in the sequence Lupolen 3020 D/Nipoflex 750/copolyester, are: 40 μm/4 μm/25 μm. The film is completely transparent and shows excellent deep-drawability on a Mahaffy & Harder deep-drawing and packaging machine; the laminate film is still completely transparent even after the deep-drawing process and the individual films do not become detached from one another.

What we claim is:

1. Deep-drawable, transparent laminate films of polyethylene films, polyester films and an adhesion promoter, characterised in that at least one unstretched polyester film consisting of or based on polyethylene terephthalate, having a crystallisation temperature of at least 150°C, measured in the film, is bonded via an adhesion-promoting layer of ethylene/vinyl acetate copolymer to at least one unstretched polyethylene film.

2. Laminate films according to claim 1, characterised in that the polyethylene film consists of low density polyethylene.

3. Laminate films according to claim 1, characterised in that the polyester film has a crystallisation temperature of at least 160°C.

4. Laminate films according to claim 1, characterised in that the polyester film consists of a polyethylene terephthalate which contains at least 25 mol %, preferably at least 40 mol %, of condensed terephthalic acid radicals and at least 25 mol %, preferably at least 40 mol %, of condensed ethylene glycol radicals, relative to the polyester.

5. Laminate films according to claim 4, characterised in that the polyethylene terephthalate contains 1 to 10 mol % of isophthalic acid radicals.

6. Laminate films according to claim 4, characterised in that the polyethylene terephthalate contains 1 to 10 mol %, especially 2.5 to 7.5 mol %, of 2,2'-dimethyl-bis-(4'-hydroxyethoxyphenyl)propane radicals.

7. Laminate films according to claim 4, characterised in that the polyethylene terephthalate contains 1 to 7.5 mol %, in particular 2.5 to 5 mol %, of 1,6-trimethyl-hexanediol.

8. Laminate films according to claim 1, characterised in that the ethylene/vinyl acetate copolymer has a melting point of 40° to 95°C, preferably 45° to 75°C.

9. Process for the manufacture of deep-drawable transparent laminate films of unstretched polyethylene films, unstretched polyester films having a crystallisation temperature of at least 150°C, measured in the film, and an adhesion promoter, characterised in that a) at least one polyethylene moulding material, b) at least one polyester moulding material consisting of, or based on, polyethylene terephthalate having a crystallisation temperature above 150°C and c) a moulding material of an ethylene/vinyl acetate copolymer as the adhesion promoter, are converted into the form of layers by co-extrusion by means of a multi-layer die or by means of several individual dies and the layers are bonded to one another, whilst still in the molten state, in the die or shortly after leaving the die.

10. Process according to claim 9, characterised in that the crystallisation temperature is at least 160°C, preferably at least 170°C.

* * * * *